3,033,886
ORGANO-MERCURY COMPOUNDS

Donald J. Foster, South Charleston, and Erich Tobler, Charleston, W. Va., assignors to Union Carbide Corporation, a corporation of New York
No Drawing. Filed Apr. 6, 1960, Ser. No. 20,263
3 Claims. (Cl. 260—431)

This invention relates to two new organo-mercury compounds, bis-(vinylmercuri)-acetylene and bis-(cyclopropylmercuri)-acetylene.

The compound bis-(vinylmercuri)-acetylene is a colorless crystalline solid and may be represented by the formula:

$$CH_2=CH-Hg-C\equiv C-Hg-CH=CH_2$$

The compound bis-(cyclopropylmercuri)-acetylene is a white crystalline solid and may be represented by the formula:

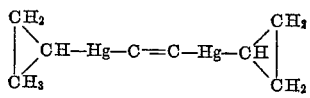

Both compounds are potent fungicides, being particularly effective against *Fusarium gladiola* and *Aspergillus oryzae*. In a test, for example, these organisms were cultured individually on potato dextrose agar (pH 4.5 to 5.5) at a temperature of 20° C. Addition of 1.5 parts per million of bis-(vinylmercuri)-acetylene prevented any growth of the test fungi during a five day incubation period. Bis-(vinylmercuri)-acetylene and bis-(cyclopropylmercuri)-acetylene, in a solvent vehicle, can be used in concentrations of 1.5 to 6 parts per million as anti-fungus additives for paint. They are also useful in preventing fungus attack on paper pulp prior to processing it into paper.

These compounds may be made by reacting an organomercuric halide of the formula RHgX, wherein R is vinyl or cyclopropyl and X is a halogen, is reacted with acetylene in the presence of a base according to the formula:

$$2RHgX + HC\equiv CH + 2OH^- \rightarrow RHgC\equiv CHgR + 2X^- + 2H_2O$$

The halogen is preferably chlorine. The base is one capable of providing hydroxyl ions to the reaction, with sodium hydroxide and potassium hydroxide being particularly suitable.

While only stoichiometric quantities of the reactants are required, it is convenient to use an excess of acetylene, as by bubbling acetylene through an aqueous solution of the base and its organo-mercuric halide. At least one mol of base per mol of organo-mercuric halide are preferably present. The reaction proceeds well at room temperature although warming may be employed if desired to hasten the reaction.

Divinyl mercury can be made by adding mercuric chloride to vinylsodium in a solvent such as butyl ether.

Example I

Acetylene was bubbled into a solution containing 22 grams (0.084 mol) of vinylmercuric chloride dissolved in 1000 ml. of ten percent aqueous sodium hydroxide at room temperature until no further weight increase was observed. Nitrogen was subsequently bubbled through the solution to remove the dissolved acetylene. The white precipitate was filtered off and washed repeatedly with water and ethyl ether. The colorless crystals of bis-(vinylmercuri)-acetylene, weight 18.5 grams representing a yield of 92 percent of the theoretical. The infrared spectra and the elemental analysis were consistent with the assigned structure. Further proof of structure was obtained by adding hydrochloric acid to

*Analysis.*—Calcd. for $C_6H_6Hg_2$: C, 15.1; H, 1.25; Hg, 83.65. Found: C, 15.3; H, 1.21; Hg, 83.5 a weighed sample of bis-(vinylmercuri)-acetylene and collecting the evolved gas. The gaseous products consisted exclusively of acetylene and ethylene as determined in a mass spectrometer. The mercury was isolated as mercuric chloride from this cleavage.

Example II

Acetylene was bubbled into a solution containing 15 grams (0.05 mol) of vinylmercuric bromide and ten grams of potassium hydroxide in one liter of ethanol at room temperature. A white precipitate was filtered off and after washing repeatedly with water and ethanol it was shown to be identical with the product obtained in Example I. The yield was quantitative calculated from vinylmercuric bromide.

Example III

Acetylene was introduced into a solution containing 0.55 gram (0.002 mol) of cyclopropylmercuric chloride, 0.9 gram of sodium hydroxide and 150 ml. of ethanol. The solution immediately became turbid and soon precipitated 0.87 gram of white solid which was subsequently identified by elemental and spectroscopic analysis as bis-(cyclopropylmercuri)-acetylene. The infrared spectrum contained the characteristic

*Analysis.*—Calcd. for $C_8H_{10}Hg_2$: C, 18.95; H, 1.99; Hg, 79.06. Found: C, 18.82; H, 2.08; Hg, 78.9 absorptions for the cyclopropyl group. Hydrochloric acid cleavage of the product produced mercuric chloride and a gas which was analyzed in a mass spectrometer and found to be primarily a mixture of cyclopropane and acetylene.

What is claimed is:
1. A compound of the formula:

$$RHgC\equiv CHgR$$

wherein R is selected from the group consisting of vinyl and cyclopropyl.
2. Bis-(vinylmercuri)-acetylene.
3. Bis-(cyclopropylmercuri)-acetylene.

References Cited in the file of this patent
UNITED STATES PATENTS

| | | |
|---|---|---|
| 2,145,595 | Gornitz et al. | Jan. 31, 1939 |
| 2,228,752 | Carter | Jan. 14, 1941 |
| 2,251,778 | Bonrath et al. | Aug. 5, 1941 |

UNITED STATES PATENT OFFICE
CERTIFICATE OF CORRECTION

Patent No. 3,033,886                                    May 8, 1962

Donald J. Foster et al.

It is hereby certified that error appears in the above numbered patent requiring correction and that the said Letters Patent should read as corrected below.

Column 1, lines 20 to 23, the formula should appear as shown below instead of as in the patent:

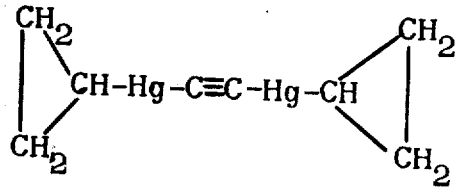

Signed and sealed this 4th day of September 1962.

(SEAL)
Attest:
ERNEST W. SWIDER
Attesting Officer

DAVID L. LADD
Commissioner of Patents